United States Patent [19]

Martino et al.

[11] Patent Number: 6,061,646

[45] Date of Patent: May 9, 2000

[54] KIOSK FOR MULTIPLE SPOKEN LANGUAGES

[75] Inventors: Michael John Martino; Robert Charles Paulsen, Jr., both of Austin, Tex.

[73] Assignee: International Business Machines Corp., Armonk, N.Y.

[21] Appl. No.: 08/993,606

[22] Filed: Dec. 18, 1997

[51] Int. Cl.[7] .............................. G06F 17/28; H04M 1/64
[52] U.S. Cl. ................. 704/3; 379/88.06; 704/9
[58] Field of Search ............................... 704/1, 2–7, 254, 704/257, 270, 275, 277; 379/88.04, 88.05, 88.06

[56] References Cited

U.S. PATENT DOCUMENTS

| | | | |
|---|---|---|---|
| 5,353,335 | 10/1994 | D'Urso et al. ............................. | 379/67 |
| 5,375,164 | 12/1994 | Jennings ............................... | 379/88.05 |
| 5,388,146 | 2/1995 | Morduch et al. ......................... | 379/52 |
| 5,440,615 | 8/1995 | Caccuro et al. ..................... | 379/88.05 |
| 5,481,589 | 1/1996 | Morduch ................................ | 379/97 |
| 5,497,319 | 3/1996 | Chong et al. .............................. | 704/2 |
| 5,548,507 | 8/1996 | Martino et al. ............................. | 704/9 |
| 5,751,957 | 5/1998 | Hiroya et al. ................................ | 704/2 |
| 5,758,023 | 5/1998 | Bordeaux ................................ | 704/251 |
| 5,797,116 | 8/1998 | Yamada et al. ........................... | 704/10 |
| 5,797,125 | 8/1998 | Hirohama ................................ | 704/277 |
| 5,805,771 | 9/1998 | Muthasamy et al. .................... | 704/257 |
| 5,875,422 | 3/1999 | Eslambolchi et al. ............... | 379/88.06 |

*Primary Examiner*—Forester W. Isen
*Assistant Examiner*—Patrick N. Edouard
*Attorney, Agent, or Firm*—Jeffrey S. LaBaw

[57] ABSTRACT

The method for providing information in response to a question in one of a plurality of natural spoken languages begins by recognizing a detected utterance with a speech recognition engine equipped with a plurality of small dictionaries. Each of the small dictionaries is for respective one of the plurality of languages. Each small dictionary including speech data for a selected few common words in the respective language. Next, the method selects one of the plurality of languages as the language of the detected utterance based on a number of recognized words for each language from the small dictionaries. Next, a more thorough recognition of the detected utterance using a large dictionary for the language of the detected utterance which contains information on a much larger vocabulary. Finally, the method responds to the user in the selected language, i.e. the language of the detected utterance, either aurally or visually. Once the language of a first utterance is identified, a timer is started. Responsive to detecting a new utterance within a predetermined period, the method continues using the large dictionary to recognize the new detected utterance and responding to the user in the language of the detected utterance. If the timer times out, the method reinitializes and a new utterance is tested by all of the small dictionaries.

22 Claims, 4 Drawing Sheets

KIOSK FOR MULTIPLE SPOKEN LANGUAGES

BACKGROUND OF THE INVENTION

This invention relate generally to speech recognition with a data processing system. More particularly, it relates to a natural language sensitive kiosk that will accept verbal input from a human or machine in any of a plurality of languages and which will then respond to the requests in the natural language of the inquiry.

Computers have become a presence in many facets of today's society. Once upon a time, when computing was the sole domain of highly skilled computer programmers, the user interface was text based. The computer provided text based output and the programmer provided often arcane commands in a command line interface. Given the skill of the users, this was an acceptable state of affairs, while hardly desirable. Gradually, efforts to make the computer user interface more "user friendly" were made, as less skilled segments of society began to have daily contact with computers. Such efforts have led to graphical user interfaces which mimic everyday objects as well as more user friendly input devices such as touch screens.

Another "user friendly" interface is a speech interface which recognizes a user's speech and synthesizes speech rather than, or in addition to, a visual interface. Both speech recognition and speech synthesis are well known technologies yet both have failed to fulfill the dreams of technologists or science fiction writers in the field. One of the problems confronted by speech technology is that it takes a great deal of raw processor speed to allow the computer to recognize speech even in a single language. Further, the speech dictionaries which are required for speech recognition are truly awesome in their size.

It would be desirable to provide a multilingual speech interface which could understand and respond in several different spoken languages. Such an interface would be useful to provide computing based services in venues in which people of limited computer skill and who speak different languages congregate. It would be desirable that a user could approach the kiosk, ask a question in his native language, and have the kiosk respond to the user in his native language either by speech output or through the displayed interface. There are a number of situations in which such a natural language kiosk would be useful. These situations include, but are not limited to, the Olympics for directions to events and buildings, for scores, medals and standings of competitors; airports for information and directions to baggage pickups, taxi stands, casinos, limousine services, car rental desks, ticket counters and arrival & departure gates; train and bus stations for services similar to airports; ports-of-entry for information and directions; international attractions such as the Eiffel Tower, for information, ticket counters and directions; EPCOT Center for restaurant reservations and generally, any place or event at which there will be a number of people whose native languages will be different. Input from a telephone (or computer) is considered machine input, although it may be similar to a spoken utterance.

The problems faced for speech recognition and speech synthesis are compounded by having a plurality of possible languages to understand and to which to respond. Essentially, the massive speech dictionaries and speech recognition engines must be replicated for each language. Since a typical speech recognition machine typically requires at least 32 MB of RAM with a high powered processor, it becomes difficult, if not impossible, and certainly expensive, to support a large number of spoken natural languages.

The present invention provides another solution to the problem.

SUMMARY OF THE INVENTION

It is therefore an object of the invention to respond to a plurality of spoken natural languages according to a detected utterance in one of the supported natural languages.

It is another object of the invention to provide an aural response in a natural language according to a detected utterance in a supported natural language.

It is another object of the invention to provide a mechanism which is very, very fast.

It is another object of the invention to minimize the memory requirements.

It is another object of the invention to present as seamless an interface to the user as possible.

These objects and others are accomplished by breaking the speech recognition task into two parts. The first part is to recognize the natural language of the spoken utterance. According to the invention, this can be performed with a small dictionary containing only the most common words in each of the supported languages. Once the language is recognized, the full dictionary for the recognized language is recalled and the speech recognition tool analyzes the utterance more fully to identify all of the spoken words. While the words in the small dictionary are relatively useless for discovering what the user wants, they are very useful for identifying the language, since they occur in the language with high frequency. By keeping only a small number of words in the language recognition dictionary, memory requirements for supporting a plurality of languages are relatively modest.

The method for providing information in response to a question in one of a plurality of natural spoken languages begins by recognizing a detected utterance with a speech recognition engine equipped with a plurality of small dictionaries. Each of the small dictionaries is for one of the plurality of languages. Each small dictionary includes speech data for a selected few common words in the respective language. Next, the method selects one of the plurality of languages as the language of the detected utterance based on a number of recognized words for each language from the small dictionaries. Next, a more thorough recognition is made of the detected utterance using a large dictionary for the language of the detected utterance which contains information on a much larger vocabulary. Finally, the method responds to the user in the selected language, i.e. the language of the detected utterance, either aurally or visually. Once the language of a first utterance is identified, a timer is started. Responsive to detecting a new utterance within a predetermined period, the method continues using the large dictionary to recognize the new detected utterance and responds to the user in the language of the detected utterance. If the timer times out, the method reinitializes and a new utterance is tested by all of the small dictionaries.

DETAILED DESCRIPTION OF THE DRAWINGS

In this specification, the term "language" means a natural language, i.e. human language, used for human communications, e.g., English, French, Spanish, German, and so forth. Genre is defined herein as a distinctive style of use of a language in some specific context. For example, genre within English includes technical writing, business writing, legal writing, medical writing, fiction, and many others. Thus, genre applies to different variations of the same language involving different styles and manners of word use within a natural language which are reflected in coded documents, and may involve a distinctive use of standard words in a language or may add new words to a language. Genre may reflect particular jargons and dialects of a language such as High German, Low German, and Swiss German, or as London English and New York English. Genre may also reflect a specialized task, i.e. an informational kiosk for a railway station, for which a special set of words will be used most frequently by a user.

Although the invention will be described below in terms of Romance and Germanic languages with which the inventors are most familiar, ideographic languages such as Japanese, Chinese and Korean can be handled by this invention. Thus, the mechanism of this invention can be applied to any language, without regard to the alphabet or word form required for the human-readable printed symbols used for the respective languages.

The invention may be run on a variety of computers or collection of computers under a number of different operating systems. The computer could be, for example, a personal computer, a mini computer, mainframe computer or a computer running in a distributed network of other computers. Although the specific choice of computer is limited only by processor speed and disk storage requirements, computers in the IBM PC series of computers could be used in the present invention. One operating system which an IBM personal computer may run is IBM's OS/2 Warp 4.0. In the alternative, the computer system might be in the IBM RISC System/6000 (TM) line of computers which run on the AIX (TM) operating system.

Figure 1:
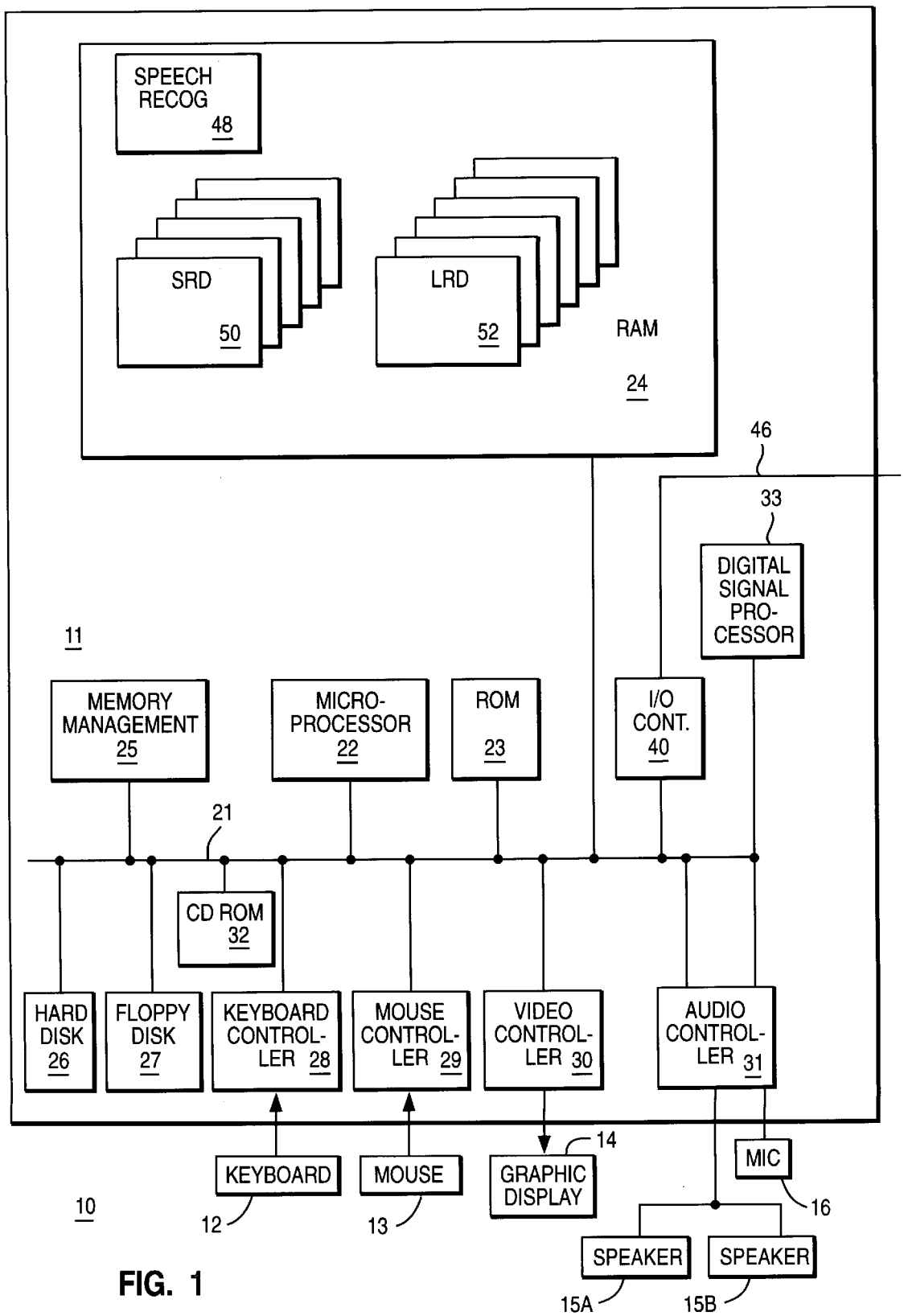
FIG. 1 is a functional block diagram of the current invention, a general data processing system containing data and controls for determining the language of a document.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PC series of computers is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM. Other RISC chips made by Hewlett Packard, Sun, Motorola and others may be used in the specific computer.

The ROM 23 contains among other code the Basic Input-Output system (BIOS) which controls basic hardware operations such as the interaction of the processor and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15 and microphone 16. An I/O controller 40 such as a Token Ring Adapter enables communication over a network 46 to other data processing systems.

One of the preferred implementations of the invention is as sets of instructions 48–52 resident in the random access memory 24 of one or more computer systems configured generally as described above. Until required by the computer system, the set of instructions may be stored in another computer readable memory, for example, in the hard disk drive 26, or in a removable memory such as an optical disk for eventual use in the CD-ROM 32 or in a floppy disk for eventual use in the floppy disk drive 27. Further, the set of instructions can be stored in the memory of another computer and transmitted in a computer readable medium over a local area network or a wide area network such as the Internet hen desired by the user. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements.

Further, the invention is often described in terms that could be associated with a human operator. While the operations performed may be in response to user input, no action by a human operator is desirable in any of the operations described herein which form part of the present invention; the operations are machine operations processing electrical signals to generate other electrical signals.

The present invention enables the computer to determine the natural language of the inquiry and to condition the computer so that its initial and subsequent responses are in the same natural language as the inquiry. One particularly preferred embodiment is as a multiuser kiosk which provides information or services in a plurality of languages in a public arena.

Figure 2:
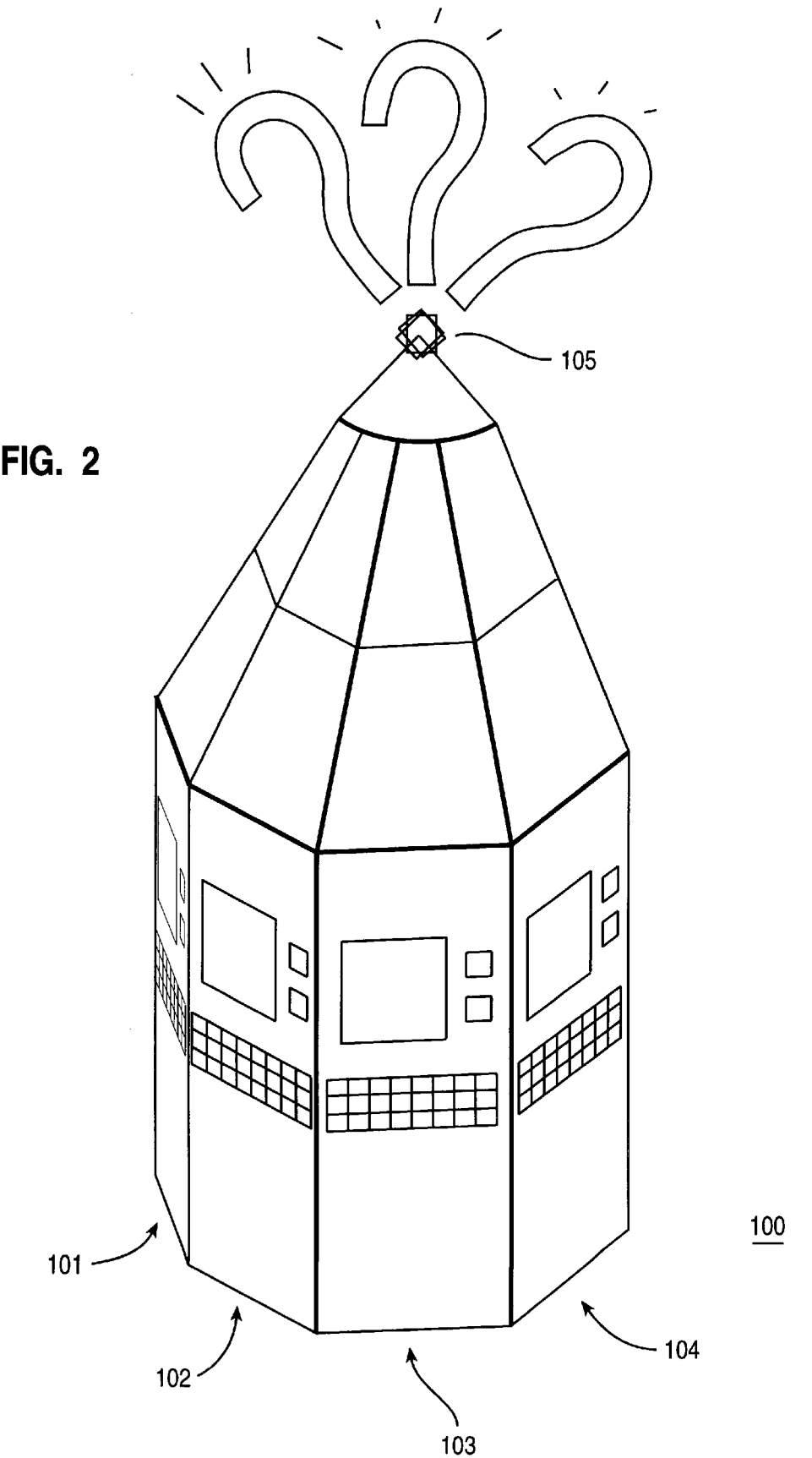
FIG. 2 depicts an information kiosk in which the present invention is practiced.

As shown in FIG. 2, the kiosk 100 could have an octagonal shape about 10 feet in height with 8 stations 101, 102, 103 and 104 (others not shown) located around the periphery. Each of the stations would be configured generally as described above. For an information kiosk, the top of might be adorned with a large, white, animated question mark 105 on a blue background. Each of the 8 stations is equipped with a microphone for input and speakers, a display screen, printer, and so forth for output. The image on the display is of a person at a kiosk speaking into the microphone; its intention is to cue an individual who approaches the kiosk to speak into the microphone. Whenever this occurs, the kiosk determines what natural language was spoken, conditions itself for processing that language and responds in that spoken language; when needed, the display is utilized to provide a visual reference (like a map) labelled in the same language the individual and kiosk are using to communicate. For the machine or telephone kiosk, the physical units would likely vary; a FAX unit might be provided for output, for example.

The information kiosk requires the capability to recognize which language has been spoken into the microphone. While the current speech recognition engines use a significantly large dictionary (and the kiosk may be equipped with one) the initial speech recognition process does not require such a large dictionary. A very limited vocabulary is required to recognize a language. Where the topics of conversation are basic and limited, as they would be for the information kiosks, even the vocabulary requirements of the larger dictionaries can be relatively modest compared to a dictation/speech recognizer.

While scholarly studies of the frequency of occurrence of spoken words have not been found by the inventors, they are familiar with a number of works which count the frequency for written documents. For example, from the "Frequency Dictionary of Italian Words," in the series, THE ROMANCE LANGUAGES AND THEIR STRUCTURES, directed by Alphonse Juilland and authored by Vincenzo Traversa, published by Mouton, The Hague, in 1973, it was determined that 148 of the words (or forms, meaning verb forms, adjective & adverb genders, etc) are responsible for 40% of the written language. That is, 199,443 of the tokens counted in the study of 500,000 Italian words, in 5 different genre, were exactly these 148 words. It is important to understand what this statistic means, especially in a language like Italian. The verb "essere" which is used and occurs much as its corresponding verb, "to be", does in English, has a combined count of 12,272 occurrences. However, this does not mean that "essere" was counted that many times, but rather that "essere" plus all its forms were counted that many times. So while the form "era" was counted 1317 times, most of the 50 other forms, from "eran" to "fossi" to "sarete" and "sii," had very low occurrences. The 148 Italian words that are used in the dictionary for Italian recognition are words, or forms of words, whose lowest frequency of occurrence is quite high. A word that was counted exactly 500 times, for instance, has a frequency of occurrence in the language of 1 in 1000 or 0.1%. The first 5 words, "di," "e," "che," "la," and "il" have a combined occurrence of 54,657 or these words make up about 10.1% of the language, while each of the next five words make about 1% each so that the ten most common words in Italian comprise 16.2% of the written language.

Similar results were found for all the languages studied by the inventors; these results will hold for essentially all languages. Now for English, which is not an inflected language and has essentially no gender requirements, the ten most frequent words comprise fully 24.2% of the written language; achieving the 40% level requires only 47 words.

Table 1 below demonstrates why relatively few words are required to be in a word table. The data for Table 1 are taken from Computational Analysis of Present-day American English by H. Kucera and W. N. Francis and published by the Brown University Press, Providence, R.I., 1967. It lists the twelve most common words in written English in MEASURED FREQUENCY order from top to bottom. The MEASURED FREQUENCY is stated as the average count for each common word per 100 words used in the (written) English language, determined over the total word count in a very large number of English documents. Each CUMULATIVE FREQUENCY in Table 1 is the sum of the MEASURED FREQUENCIES for all words in the table from that point and above. Thus, in a representative sample of written English text, approximately 20% of the words in the text will be one of the first six words in Table 1; fully 26% will be one of the 12 words in the table. Thus, relatively few words represent a substantial portion of representative text. Similar tables showing similar statistics can be constructed for other languages.

TABLE 1

The Twelve Most Common English Words

| WORD | MEASURED FREQUENCY | CUMULATIVE FREQUENCY |
|---|---|---|
| the | 6.899 | 6.899 |
| of | 3.590 | 10.489 |
| and | 2.845 | 13.334 |
| to | 2.578 | 15.912 |
| a | 2.291 | 18.203 |
| in | 2.104 | 20.307 |
| that | 1.045 | 21.352 |
| was | 0.995 | 22.347 |
| he | 0.968 | 23.315 |
| for | 0.941 | 24.256 |
| it | 0.936 | 25.192 |
| with | 0.863 | 26.055 |

To compute a word table for the n most frequently occurring words in a given language or genre where the actual frequency of the words within the language is known, the following method can be used:

Step 1: Compute the total number of occurrences for each of the most common n words in each of the languages under consideration.

Step 2: Place each of the most frequently occurring words in each of the languages in the Word Frequency Tables and set the weight to 1 for each of the words.

Thus, the frequencies of occurrence in the simple counting method are merely used to set up the word lists in the word table to assure that the words in each have a substantially equivalent coverage of each of the candidate languages. The word tables can simply be a list of the most common words or may include weights associated with the most common words. The weights can be computed in a variety of ways, although the applicants presently believe, if weights are to be used aat all, that the most preferred weight is as closely representative of the actual frequency of occurrence of the word in the language as possible.

In English, 46 words are adequate to give an approximate 40% coverage, whereas in Italian, 148 words are needed.

Thus, it can be inferred that the small language recognition dictionary must store about 3 times as many common Italian words to "know as much" Italian as it would know from only 47 English words. However, there is no requirement that precisely equal percentiles of words be kept so long as the language recognition, i.e. differentiation, was reliable.

However, spoken languages are typically further simplified by the native speakers and this is as true in Italian as it is in English.

This simplification of speech is very likely to reduce further the required vocabulary size for language recognition. In any case, the point of this discussion of Italian and English was to provide some of the basic statistics; the statistic is that a very few words are very highly used in languages and if these can be recognized, the language can be recognized.

A prerequisite for the invention below is to create mall dictionaries for each of the languages supported by the multilingual kiosk. The statistics gathered by the scholarly studies could be used as basis for such dictionaries. However, a better approach would be to capture speech samples for the languages of interest and to manually or electronically count them. Since in the process of building the dictionary, the language is known, a full fledged speech recognizer can be utilized in this process. For each word in the top 50%, i.e. the most frequently used words in the language, a set of voice waveforms or a single voice waveform with algorithmic information which account for variations in the way that different speakers of the language pronounce the word is stored. Thus, while the number of words for a dictionary in the spoken language which comprise a given frequency of occurrence is likely to be fewer than a corresponding dictionary of written words for the same frequency of occurrence, each entry is likely to be more complex.

Further, if the kiosk will be used for a specific purpose, e.g., an information kisok, a specialized dictionary can be developed for the task at hand. In the case of an information kiosk, interrogatives such as "Where", "How" and "What" are likely to be used at a greater frequency than their occurrence in the English language as a whole. Therefore, the small dictionaries for special purpose machines can be optimized. However, a general dictionary so long as it has sufficient coverage of the language is expected to perform adequately as well.

A short digression is required on genre which have been studied extensively because they are very similar to the idea of a limited universe of discourse for which a kiosk might be used. For given situations the vocabulary, regardless of how specialized it might be, will still have a set of words that will occur with a high frequency. If we consider focused discussions in medicine, engineering or philosophy, for example, a jargon exists and is used. This jargon may be taken as evidence that a set of highly used words (typically for the basic concepts and practices of the discipline) exist, and in the unlikely absence of the common words, this jargon will serve as the recognition vocabulary. However, even in the genre samples used in compiling the data for English, the high frequency words still have a high frequency of occurrence.

The study of American English, "Computational Analysis of Present-Day American English," by H. Kucera and W. N. Francis, Brown University Press, Providence, R.I., 1967, created a corpus (called The Corpus) of 1,014,232 words drawn from 500 samples of about 2000 words each in 15 different genre. The genre included press: reportage, editorial and reviews, five genre of fiction and one of humor among the 15 genres studied. The data establishes that there are the common words which are common across all genre.

This table is built from the statistics on each of the common words in each of the 15 genre so that "the" occurs in one of the genre with a frequency of 7.26% versus its occurrence in The Corpus of 6.90% and "the" occurs in a different genre at the lowest frequency of 5.09%. The point is that for all 15 genre in the study, the frequencies of occurrences of the most highly used words, while they vary from genre to genre, still occur with high frequency. It is this fact that allows the kiosk to recognize a natural language even though the semantic content of the interchanges will be different for different applications.

The elements and operation of the kiosk are discussed below with reference to FIG. 3. For the purposes of description, the number of natural languages supported by the kiosk is limited to 8. While it is clear that additional system resources will be required if the number of languages to be recognized is larger, the essential mechanism allows replication so that increasing the number of languages is a scaling problem, but not a methodological one. The additional resources are likely to be for permanent disk space which is relatively inexpensive. Given current technology, many more than eight languages could be supported on a top of the line personal computer with 6 gigabytes of hard file memory using the present invention.

Aside from the physical construction of the kiosk housing, and the computer hardware therein, the essential components are: a speech recognition engine, 16 dictionaries, 2 for each language, a language recognizer, a retrieval module for retrieving the large dictionaries and a response module for responding to user queries either by generating synthesized speech, or retrieving prerecorded responses to frequently asked questions or by providing visual output on a display device.

Figure 3:
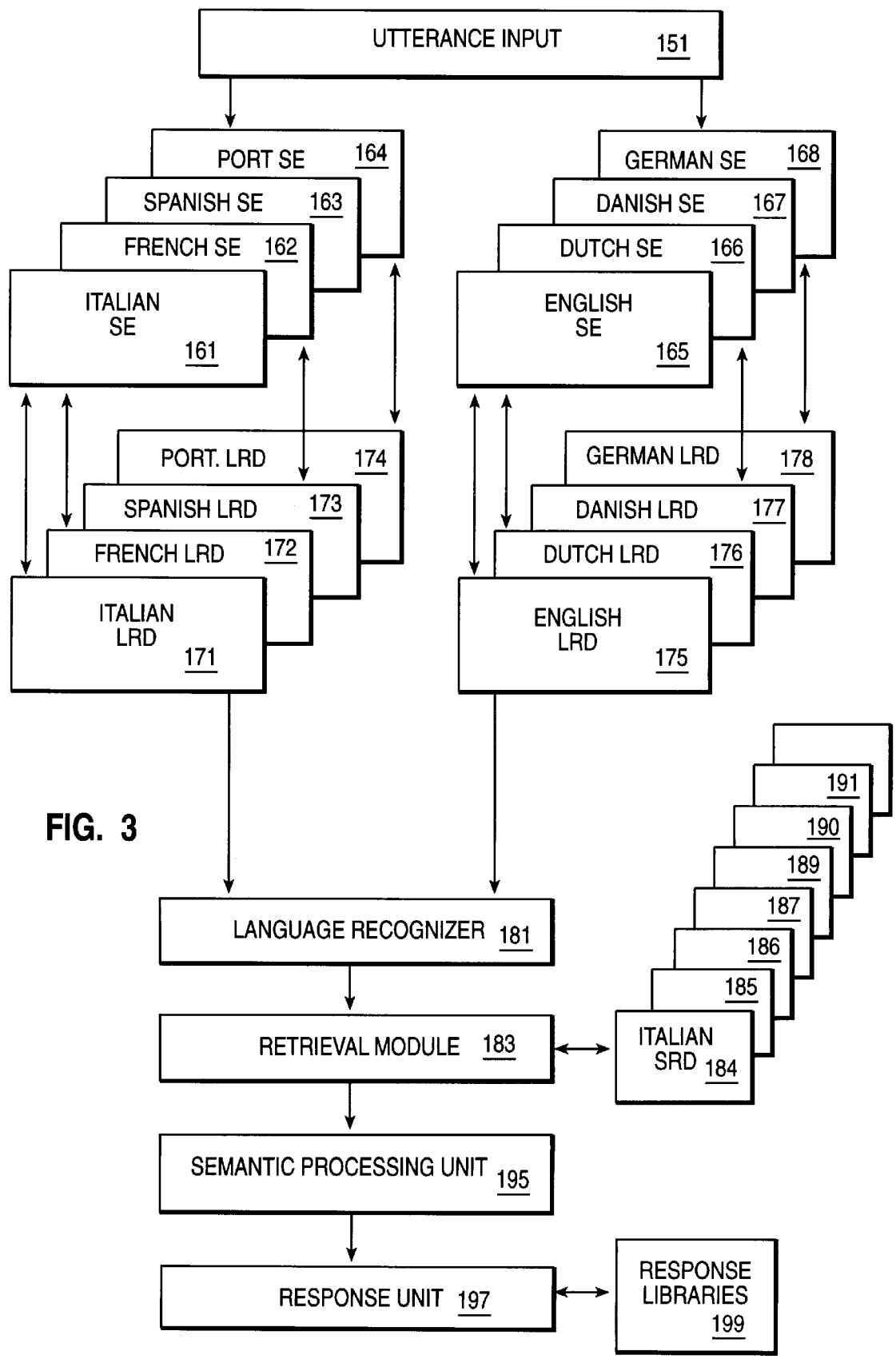
FIG. 3 is a block diagram of the functional modules needed for practicing the present invention.
Figure 4:
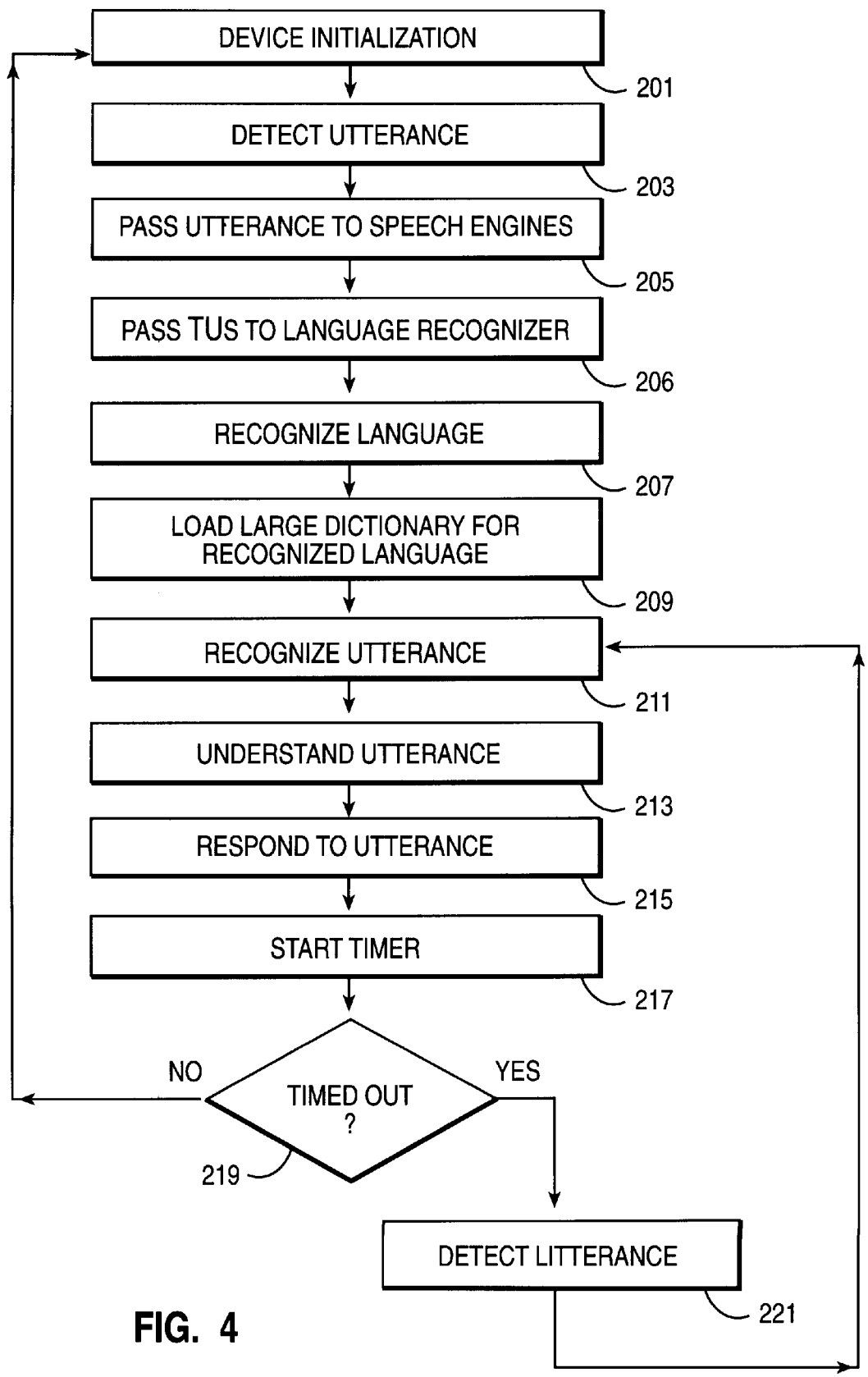
FIG. 4 is a flow diagram of the process of the present invention.

The discussion below describes an illustrative embodiment as shown in FIGS. 3 and 4, i.e. how they are combined and the method used for realizing the operation of the kiosk. Various alternatives are also discussed below. As the language discussions above have made apparent, no loss of generality occurs because of this restriction to eight languages.

The invention provides a device for people who speak one of 8 different languages, which they can use by speaking in their native language without prior conditioning of the device. "Prior conditioning" means using mechanical, electrical, electronic or other means to establish for the device, the natural language in which transactions will occur. For example, in South Texas and South Florida, among other places in the U.S., many personal banking machines, e.g., ATMs, present their users with a screen choice of "Espanol" or "English", while in Quebec, Canada, such devices present a choice of "Francois" or "English". In these cases, the customer is required to select a language or the accept the default, e.g., English, in the U.S.

Certainly, a kiosk can be built with exactly the same approach; the customer would choose among the available languages prior to beginning his transaction. While this is not a particularly onerous requirement, it does demand the ability to read, which makes the use of such devices by visually handicapped people somewhat problematical. At the same time, the devices represent an engineering simplification rather than a solution to the problem.

Finally, the additional hardware represents an added cost, although in fairness to the ATM's, they are designed to re-use the same buttons with different display labels. This invention does the job better.

It should be noted that any known, or future developed, speech recognition tool, and if desired speech synthesis tool to respond to the user, can be used in the invention. The invention is directed at the problem of solving how a plurality of such memory and processor intensive tools can be automated on one or more machines, even a personal computer class device.

As shown in FIG. 3, the utterance input module 151 accepts the detected spoken inquiry. Some preprocessing of the utterance is possible, e.g., stripping out background noise, separating the utterance into syllables, and so forth, but this will probably be minimal. The utterance input module 151 will forward the utterance to one or more speech recognition engines 161–168. In the figure, a separate speech engine is shown for each language. However, for the initial language recognition, it is possible to use a single speech recognition engine. In this case, the lightweight dictionaries may be augmented with some rules which are helpful for recognizing a particular language. Further, a speech recognition engine may be used for related languages. As shown in the figure, Italian, French, Spanish and Portuguese are Romance languages are grouped together, while English, Dutch, Danish and German are Germanic languages. Thus, there could be a single Romance language speech recognition engine and a Germanic language speech recognition engine in an alternative embodiment.

In FIG. 3, each speech recognition engine 161–168 is associated with a corresponding language recognition dictionary (LRD) 171–178 for the language. In the alternative embodiment, where a single speech recognition engine is used for the language recognition task, multiple LRDs are associated with the speech engine. The LRDs contain speaker independent waveforms for each of a set of commonly used words in each of the languages. A set of waveforms for each word to account for speaker variations such as adult female, adult male, child as well as dialects of a language to increase the probability of recognizing a word in the spoken language. Since the number of words for each language is small, e.g., less than 150, these can easily be accomplished in a modicum of memory.

Each speech recognition engine with its associated LRD will attempt to recognize some words from the utterance. It is possible that more than one speech recognition engine will recognize some words. In this phase of the process, the recognition is one of whether the words occur in the language rather than any semantic analysis of the words.

The recognized utterance will be fed to the language recognizer module 181 which basically identifies the natural language by the number of words recognized by a particular speech engine. Once the natural language is recognized, a retrieval module retrieves the speech recognition dictionary (SRD) for the natural language of the utterance from among the SRDs 184–192 for each supported language. It is possible that a more powerful version of the speech recognition tool, or additional modules might be retrieved at this point, for a more specialized analysis of the utterance.

The utterance will be recognized a second time, this time attempting to recognize all of the words in a single language using the SRD. The semantic meaning of the words will be parsed by the semantics processing unit 195. Once the meaning of the utterance is established, the response unit 197 will respond to the user, either by synthesized speech or by canned responses to frequently asked questions which may be kept in response libraries 199. Further, visual responses on the display screen in the recognized native language are also possible.

FIG. 4 is a flow diagram for one preferred method of operation for the multilingual kiosk. In step 201, the device is initialized. All eight of the speech engines are readied to accept an utterance input. The Language Recognition Dictionaries are loaded. The much larger Speech Recognition Dictionaries (SRD) and the Genre Recognition Dictionaries (GRD) are not. The GRDs are application specific words which are associated with the use of a more general purpose mechanism. In a train staion, for example, "track", "depart" and "gate" may be more easily found or have alternative representation tham in the SRDs. One of the larger dictionaries will come into play after the natural language has been determined, whereupon it will be loaded for the recognized language of the eight languages. These LRDs will be built from the most frequently occurring words in each of the languages. It is expected that the LRDs need only recognize fairly short utterances, at least for the initial transaction, the LRDs will contain enough words to provide recognition for 40 percent of each language. As noted in the Italian and English statistics above, for written languages, the upper bound will be somewhere from about 50 English words to 150 Italian words and will vary from language to language. For specialized dictionaries for specific tasks, it is also likely to vary. It is unlikely in the extreme that more than 300 words would be required to obtain this coverage for any language. Based on the inventors work, English, German, Dutch, Danish, French, Spanish, Portuguese and Italian can be easily supported by the invention. These represent the Romance and Germanic languages. Other language groups to support are the ideographic languages, i.e. Chinese, Japanese & Korean and the Slavic languages, e.g., Polish, Russian, Czech or Slovak.

In step 203, the device accepts an utterance. Someone has approached the kiosk and spoken something into the microphone. In step 205, the input utterance is passed to each of the 8 speech engines which, using the LRDs, create a Text Unit (TU) from the utterance as well as they can using only the LRDs. Portions of the utterance which are not recognized are replaced in the TU with a special word, e.g., "huh", for each segment of the utterance that was recognized as a segment, but not recognized as a word within the particular LRD.

For example, using English, this utterance, "Where is the swimming venue?", assuming error free speech recognition, would come out of the English speech engine with the LRD as "Where is the huh huh". Similarly, the utterance, "A che ora parte il treno per Dallas?" will come out of the English engine as, "A huh huh huh huh huh huh huh," and out of the Italian engine as "A che ora il huh per huh," and out of the French engine as, "A huh huh il huh huh huh." These examples assume that the speech engines match exactly based on spelling. While this is not precisely correct, it is an easy way to explain how the invention will work.

Each of the remaining 5 engines will also produce a TU in which some of the words may match the utterance and some will not. The following table projects the TUs from each engine, using the current dictionaries which have been developed from the written language analysis.

TABLE 2

Text Units by Language

| | |
|---|---|
| Utterance | A che ora parte il treno per Dallas? |
| Language | Text Unit |
| Italian | A che ora huh il huh per huh |
| Spanish | A huh huh parte il huh huh huh |
| French | A huh huh huh il huh huh huh |
| Portuguese | A huh huh huh huh huh per huh |
| English | A huh huh huh huh huh huh huh |
| Danish | huh huh huh huh huh huh huh |
| Dutch | huh huh huh huh huh huh huh |
| German | huh huh huh huh huh huh huh |

In step 206, each of the TU's is passed to the language recognizer. The language recognizer basically counts the number of hits, i.e. recognized words, and sums them on either a weighted or unwieghted basis. Based on the language with the greatest summed hits, the recognizer will signal that the language of the TU. In this case, it would signal, "Italian", meaning that Italian was the language spoken in the utterance, step 207.

In step 209, once the recognizer signals the language, the kiosk then loads the SRD to process the transactions. In this example, the utterance, "A che ora parte il treno per Dallas?" would be passed to the Italian speech engine when it had loaded the railroad station Italian SRD. In step 211, the utterance is recognized again, with the full SRD. Hopefully, the result of this step is a successful recognition of the entire sentence (in Italian) and the passing of the now complete TU to the Semantic Processing unit.

In step 213, the Semantic Processing unit will parse the input to understand the utterance and determine the correct response. In this case, that might be a synthesized speech response that the train to Dallas leaves at 4PM on track 2. This data is now cast into the recognized language (Italian) as, "Il treno per Dallas parte alle sedici su binario due," for example.

In step 215, the system responds to the user. In this case, the Italian sentence in the TU is passed to the voice response unit which provides the verbal answer to the original question, "A che ora parte il treno per Dallas," in Italian, "Il treno per Dallas parte alle sedici su binario due". The response could also be a visual message on the display monitor associated with the kiosk. Rather than synthesized speech, the kiosk could retrieve prerecorded messages, piecing stored words together if necessary, and play them back to the user.

In step 217, a timer is started. In step 219, if there has been no further input for a period of time, the kiosk returns to step 201 and waits for another input. If there is a subsequent utterance before the timer times out, step 221, the kiosk assumes that the new utterance is a continuation of the initially determined language (Italian) and goes directly to step 211 for processing.

There are a number of refinements that have been to the above description that might be part of a product. For example, it is often useful to accompany the verbal output with a visual one. Thus, the kiosk could respond in both aural and visual modes simultaneously. Further, the input utterances can be echoed on the display screen as soon as they are recognized to provide the user with feedback. In that way, the user is able to see if the kiosk is correctly recognizing his speech. In response to an incorrect recognition and therefore response, the user may adapt his speech for better recognition.

The inventors have omitted any discussion of error handling. Such processing is well known and could be easily implemented by those skilled in the art from the above description of the invention.

The invention provides a means to build an automatically multilingual speech kiosk which will accept verbal input from a human in any of a plurality of languages. Once the language is recognized, it will respond to the input in the same natural language. The ability of the kiosk to recognize the spoken natural language input with a modicum of computing resources and to condition itself so that the remainder of the transactions are in the same natural language are believed to be novel.

To the inventors' knowledge, this problem has not been solved before except through the use of human operators who speak the supported languages. The restaurant reservation system at EPCOT (TM) is an example of a human solution.

While the invention has been shown and described with reference to particular embodiments thereof, it will be understood by those skilled in the art that the invention can be practiced with modification in other environments. For example, speech navigation is an example of a limited environment which is very similar to the kiosk and where the recognition percentage is very high. The invention could also be used for navigating in a user interface in a multiuser terminal. Thus, the response to the user would be a change in the user interface. Therefore, changes in form and detail may be made without departing from the spirit and scope of the invention as set forth in the accompanying claims.

We claim:

1. A method for providing information in response to a question in one of a plurality of natural spoken languages, comprising the steps of:

recognizing a detected utterance with a speech recognition engine equipped with a plurality of small dictionaries each for respective one of the plurality of languages, each small dictionary including speech data for a selected few common words in the respective language;

selecting one of the plurality of languages as the language of the detected utterance based on a number of recognized words for each language from the small dictionaries;

recognizing the detected utterance using a large dictionary for the language of the detected utterance; and responding to the user in the selected language.

2. The method as recited in claim 1 wherein the response to the user is an aural response in the language of the detected utterance.

3. The method as recited in claim 1 further comprising the steps of:

starting a timer;

responsive to detecting a new utterance within a predetermined period, using the large dictionary to recognize the new detected utterance; and responding to the user in the language of the detected utterances.

4. The method of claim 3 further comprising the step of responsive to failure to detect a new utterance within the predetermined time period, reinitializing the system so that future utterances are recognized with the plurality of small dictionaries.

5. The method of claim 1 further comprising the step of retrieving the large dictionary from computer storage.

6. The method of claim 1 further comprising the step of storing one large dictionary as a default dictionary in a condition where it can be more quickly accessed than a plurality of other large dictionaries for respective languages.

7. The method as recited in claim 1 wherein the response is a visual display at least in part in the language of the detected utterance.

8. The method as recited in claim 1 wherein a percentage coverage in the respective natural language for each of the small dictionaries of the common words is substantially equivalent to the other small dictionaries.

9. The method as recited in claim 1 wherein the small dictionaries contain most common words in each natural language spoken during a specialized task.

10. The method as recited in claim 1 wherein the large dictionary contains words in the natural language of the detected utterance which are typically spoken during a specialized task.

11. The method as recited in claim 5 further comprising the step of retrieving a specialized speech recognition engine for the natural language of the detected utterance.

12. A system including processor and memory for providing information in response to a question in one of a plurality of natural spoken languages, comprising:

a microphone for detecting an utterance from a user;

a plurality of small dictionaries each for respective one of the plurality of languages, each small dictionary including speech data for a selected few common words in the respective language;

at least one speech recognition engine for recognizing the detected utterance, the at least one speech recognition engine using the plurality of small dictionaries to recognize words within the detected utterance;

a language recognizer for selecting one of the plurality of languages as the language of the detected utterance based on a number of recognized words for each language from the small dictionaries;

a plurality of large dictionaries for the plurality of languages usable by the at least one speech recognition engine for recognizing words within the detected utterance;

retrieval means for retrieving the large dictionary for the selected language; and means for responding to the user in the selected language.

13. The system as recited in claim 12 further comprising a speaker for responding to the user in an aural response in the language of the detected utterance.

14. The system as recited in claim 12 further comprising a speech recognition engine for each of the plurality of languages.

15. The system as recited in claim 12 further comprising a speech recognition engine for each of a plurality of language classes.

16. The system as recited in claim 12 further comprising a display for visually presenting a response at least a part of which is in the language of the detected utterance.

17. The system as recited in claim 12 wherein a percentage coverage in the respective natural language for each of the small dictionaries of the common words is substantially equivalent to the other small dictionaries.

18. The system as recited in claim 12 wherein the small dictionaries contain most common words in each natural language spoken during a specialized task.

19. The system as recited in claim 12 further comprising a specialized speech recognition engine for utilizing the large dictionary of a particular language for recognizing words of the natural language of the detected utterance.

20. A computer program product in a computer readable medium for providing information in response to a question in one of a plurality of natural spoken languages, comprising:

means for recognizing a detected utterance with according to each of a plurality of small dictionaries each for respective one of the plurality of languages, each small dictionary including speech data for a selected few common words in the respective language;

means for selecting one of the plurality of languages as the language of the detected utterance based on a number of recognized words for each language from the small dictionaries;

means for recognizing the detected utterance using a large dictionary for the language of the detected utterance; and means for responding to the user in the selected language.

21. The product as recited in claim 21 further comprising a speech synthesis module for responding to the user in the language of the detected utterance.

22. The product as recited in claim 21 further comprising:

a timer means; and means responsive to detecting a new utterance within a predetermined period for using the large dictionary to recognize the new detected utterance.

* * * * *